Patented Nov. 15, 1938

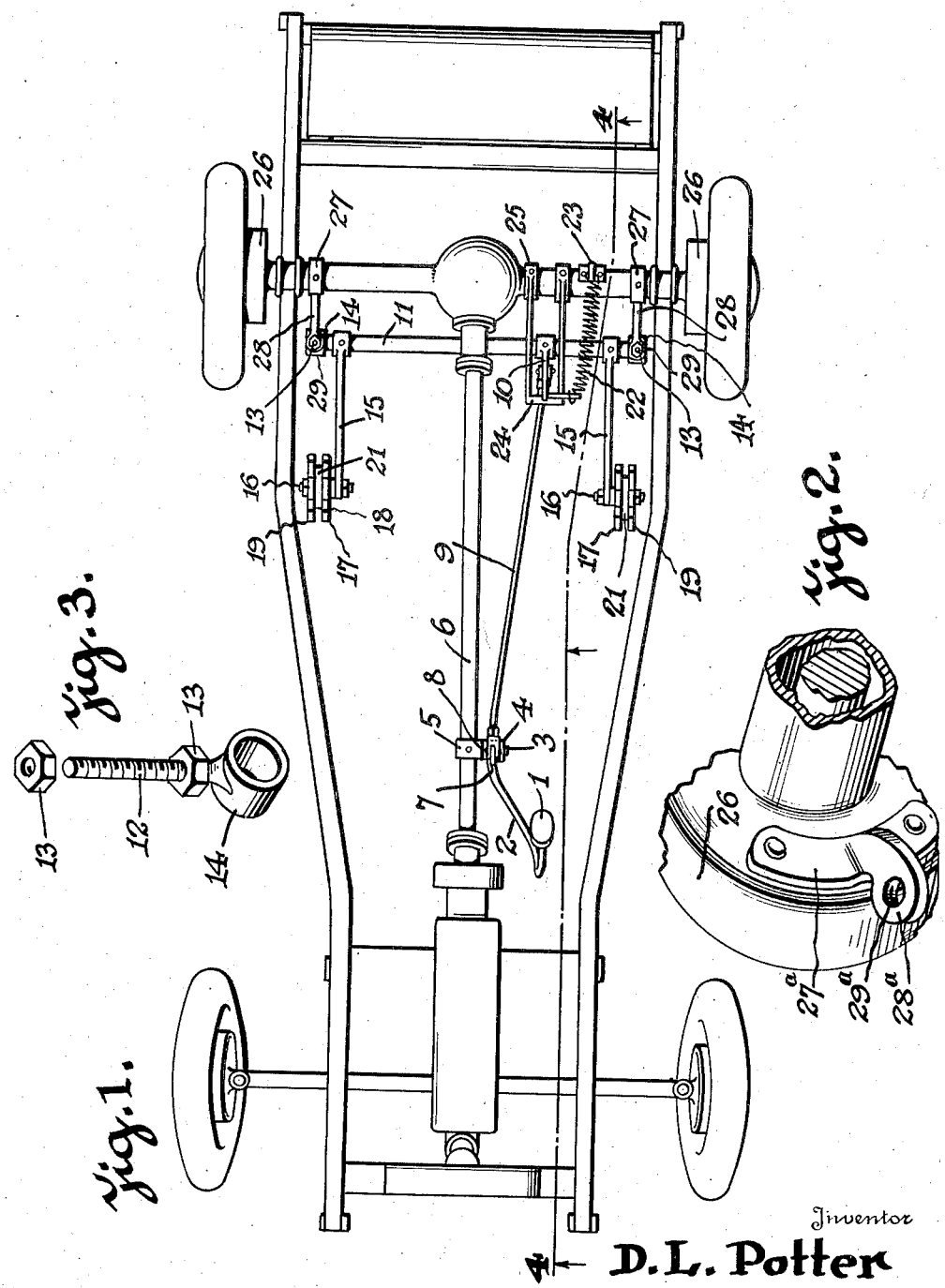

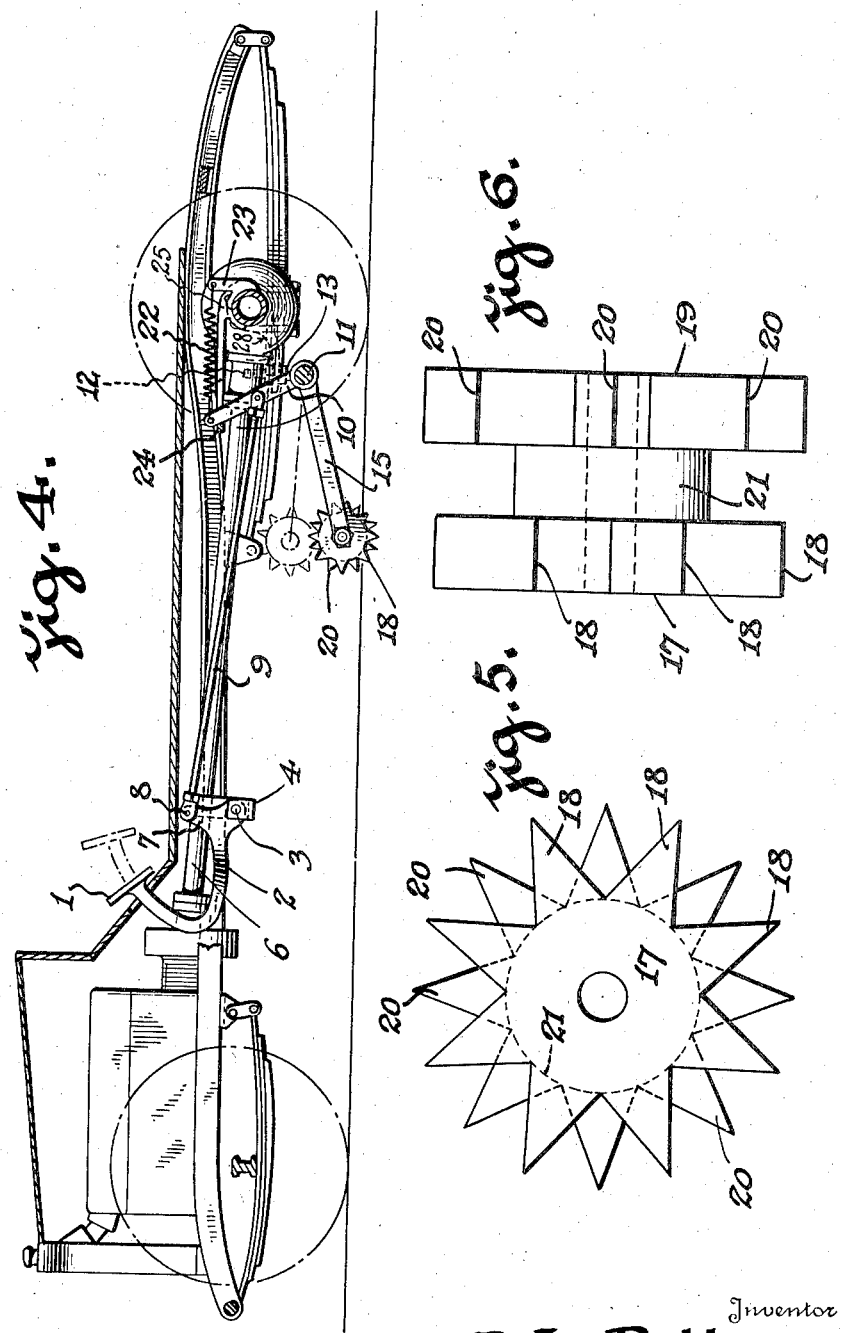

2,136,754

UNITED STATES PATENT OFFICE 2,136,754

REAR CONTROL

Duane L. Potter, Dalton, Pa.

Application April 7, 1938, Serial No. 200,794

12 Claims. (Cl. 188—5)

The object of my invention is to provide a novel rear control, the purpose of which is to prevent automobiles from skidding, and especially to provide a device of this character which is disposed in a concealed position and so positioned and arranged on the automobile or truck that it will take the burden, adhesion and driving power from the driving wheels and transfer it to spur wheels; which are so arranged and of sufficient strength to be capable of holding the vehicle to the road until it is under control and in normal position.

It is also an object of my invention to provide a device of this character which can be operated by a foot-pedal and will not require the driver to remove his hands from the steering wheel.

I attain these and other objects of my invention by the mechanism illustrated in the accompanying drawings, in which—

Figure 1 is a plan view of the invention applied to an automobile;

Fig. 2 is a detail perspective view of a modification of the invention showing a means for supporting the control shaft from the rear brake hubs instead of from the axle housing;

Fig. 3 is a detail perspective view of members 12, 13, and 14;

Fig. 4 is a longitudinal section on line 4—4 of Fig. 1;

Fig. 5 is a side elevation of one of the sets of spur wheels, and

Fig. 6 is a front elevation of same.

Referring to the accompanying drawings, I provide a foot pedal 1 on the foot-operated lever 2 which is pivotally mounted at 3 to the lower end of a depending arm 4 which is affixed by a suitable strap 5 to the drive shaft casing 6. The rear and upwardly extending portion 7 of lever 2 is operatively connected at 8 with a link 9 which in turn is attached to the bar or staple 10. Bar or staple 10 is affixed to a control shaft 11 which extends transversely of the automobile in a plane below and forward of the rear axle.

Control shaft 11 is suspended by depending arms 12 which terminate at their lower ends in loops or eyes 14 in which the control shaft is rotatably mounted. Arms 14 are threaded at their upper ends and are adjustably secured in the threaded openings 29 of metal straps 27 by means of upper and lower nuts 13, to the axle housing 26 inside the chassis frame. Members 27 are affixed to the axle housing so that the control shaft is not affected by up and down movements of the chassis.

As shown in Fig. 1, L-shaped arms 15 are affixed to spaced portions of the control shaft 11, their forward portions 16 functioning as axles for the pairs of spur wheels 17 and 19 of which there is a set for each of the arms 15. Each spur wheel set consists of an inner spur wheel 17 having V-shaped teeth 18, and a similar outer spur wheel 19 which has teeth 20 offset relative to the teeth 18 of spur wheel 17. These spur wheels are spaced by an intermediate disc 21 and the three elements are fastened together by suitable means such as rivets. In order that the spur wheels may return to their normal raised position when pressure on the foot lever is released by the driver of an automobile, the spring 22 is attached to bar or staple 10 and to a suitable fixed element such as member 23, to normally hold the bar 10, arms 15 and spur wheel sets in a raised position.

In order to limit the downwardly swingable movement of bar 10 and thereby limit the rotative movement of control shaft 11, and the downward movement of arms 15 and spur wheels 17 and 19, a lug bar 24 is provided, as shown in Fig. 1, which functions as a stop member for bar 10. Member 24 is affixed at its ends by suitable means such as metal straps 25 to the rear axle housing, as shown in Fig. 1.

Affixed to axle housing 26 are metal straps 27, as shown in Fig. 1, each provided with an ear 28 having a threaded opening 29 to receive the threaded depending post 12, which posts carry the control shaft 11, as shown in Fig. 4. I may provide a modified means for mounting control shaft 11 and posts 12, consisting of metal straps 27a affixed to the brake hub 26 and having ears 28a provided with threaded openings 29a, as shown in Fig. 2, in which position the device will be easier of access for purposes of adjustment.

It will be noted that the control shaft is placed just forward of and on the underside of the rear axle case and inside of the chassis. The rising and falling of the body of the automobile does not in any way change the position or affect the action of the control shaft or spur wheels as they are not connected with the chassis. The control shaft 11 is suspended by strong threaded steel posts 12 from the axle case 26 to which they are adjustably attached by the members 27, 28, 12, 13 and 14 at points inside the chassis frame, (or alternatively to the rear brake hubs, as shown in Fig. 2). This allows the control shaft 11 to be adjusted to a higher or lower position as circumstances require. The control shaft is rotatably mounted in the eyes or loops 14 of posts 12, allowing the shaft to rotate in order to operate the spur wheels 17 and 19 so as to firmly grip the roadway.

The spur wheels are each made of steel plate one inch thick and are three-ply in each set as shown, the center ply being without teeth. The points of the teeth are preferably spaced 1¼ inches apart and the teeth of each spur wheel are offset from the teeth of the other spur wheel of its set so as to contact the road alternately. The teeth penetrating the road in this manner resist the greatest pressure. The spur wheels are preferably made as separate elements and fastened together with suitable means such as rivets.

The sets of spur wheels are arranged inside and a small distance forward of the driving wheels. When the foot-pedal 2, is operated by the driver of the car it operates link 9, arm 11, control shaft 11, and arms 15 to lower spur wheels 17 and 19 to contact the roadway. When the spur wheels contact the road they are forced backward by the forward action of the car, until the bar or staple 10 carried by the control shaft 11 rests on the lug bar 24 which is attached to the axle housing and functions as a stop member. Much weight is now off of the driving wheels and shifted to the spur wheels, causing the driving wheels to lose adhesion, and momentum is reduced and the car is under control.

The coil spring 22 attached to bar or staple 10 and to a fixed element 23 secured to the axle housing functions to normally return the apparatus to its initial inoperative position with the spur wheels raised when the driver releases pressure from the foot-pedal 1.

When the spur wheels contact the road they are instantly forced backward until the bar 10 rests on the lug bar 24, thus taking the burden, adhesion and driving power from the driving wheels and delivering it to the spur wheels. When the car begins to skid, the control bar and spur wheels must be strong enough and capable of holding the car to the roadway until it is under control and in normal position. In a few feet it is stopped and upon release of pressure on the foot-pedal, the coil spring 22 operates to rotate the control shaft 11 and raise arms 15 which carry the spur wheels upward to their concealed and inoperative position. The driving wheels of the car thereupon resume their work and the car goes forward.

Among the advantages of my rear control are that its plurality of spur wheels give sufficient adhesion to the road to effectively prevent cars from skidding. The apparatus is easily attached to cars now in use. It is so inexpensive to manufacture as to be within reach of all car owners. It is out of sight and is not detrimental to the appearance of the car. It makes the automobile a safe vehicle under dangerous road conditions. The spur wheels being positioned in front of and not back of the rear wheels of the car are in a position to be effective in operation.

What I claim is:

1. In an anti-skid apparatus, the combination of a control shaft disposed forward of the rear wheels of the car, adjustable depending posts carrying said control shaft, a plurality of L-shaped arms mounted on the control shaft, a pair of spur wheels mounted on each of said arms, said spur wheels having their teeth offset from each other, an intermediate spacing disc between each pair of spur wheels, an upstanding bar affixed to the control shaft for operating same, foot operated means operatively connected to said bar to rotate the control shaft and lower the spur wheels to the roadway, and resilient means for returning the mechanism to its original inoperative position when pressure on the foot lever is released.

2. In an anti-skid apparatus, the combination of a control shaft disposed forward of the rear wheels of the car, depending posts carrying said control shaft, a plurality of L-shaped arms mounted on the control shaft, a pair of spur wheels mounted on each of said arms, said spur wheels having their teeth offset from each other, an intermediate spacing disc between each pair of spur wheels, an upstanding bar affixed to the control shaft for operating same, foot operated means operatively connected to said bar to rotate the control shaft and lower the spur wheels to the roadway, and resilient means for returning the mechanism to its original inoperative position when pressure on the foot lever is released.

3. In an anti-skid apparatus for motor vehicles, the combination of a control shaft disposed forward of the rear wheels of the car, adjustable depending posts carrying said control shaft, a plurality of L-shaped arms mounted on the control shaft, a pair of spur wheels mounted on each of said arms, said spur wheels having their teeth offset from each other, an upstanding bar affixed to the control shaft for operating same, foot operated means operatively connected to said bar to rotate the control shaft and lower the spur wheels to the roadway, and resilient means for returning the mechanism to its original inoperative position when pressure on the foot lever is released.

4. In an anti-skid apparatus for motor vehicles, the combination of a control shaft disposed forward of the rear wheels of the car, adjustable depending posts carrying said control shaft, a plurality of L-shaped arms mounted on the control shaft, a pair of spur wheels mounted on each of said arms, said spur wheels having their teeth offset from each other, an intermediate spacing disc between each pair of spur wheels, an upstanding bar affixed to the control shaft for operating same, foot operated means operatively connected to said bar to rotate the control shaft and lower the spur wheels to the roadway, resilient means for returning the mechanism to its original inoperative position when pressure on the foot lever is released, and a lug bar limiting the extent to which the control bar may be rotated and the spur wheels lowered.

5. In an anti-skid apparatus for motor vehicles, the combination of a control shaft disposed forward of the rear wheels of the car, detachable depending posts carrying said control shaft, a pair of L-shaped arms mounted on the control shaft, a pair of spur wheels mounted on each of said arms, said spur wheels having their teeth offset from each other, an intermediate spacing disc between each pair of spur wheels, an upstanding bar affixed to the control shaft for operating same, foot operated means operatively connected to said bar to rotate the control shaft and lower the spur wheels to the roadway, and resilient means for restoring normal raised position of the spur wheels.

6. In an anti-skid apparatus for motor vehicles, the combination of a control shaft disposed forward of the rear wheels of the car, detachable depending posts carrying said control shaft, a pair of L-shaped arms mounted on the control shaft, a pair of spur wheels mounted on each of said arms, said spur wheels having their teeth offset from each other, an intermediate spacing disc between each pair of spur wheels, an upstanding bar affixed to the control shaft for operating same, foot operated means operatively connected to said bar to rotate the control shaft and lower the spur wheels to the roadway, a lug bar limiting the extent to which the control bar may be rotated and the spur wheels lowered, and resilient means for restoring the normal raised position of the spur wheels.

7. In an anti-skid apparatus for motor vehicles, the combination of a rotatable control shaft, means for adjustably and detachably securing said shaft to the rear axle housing in a plane forward of and below the plane of the rear axle, a pair of arms affixed to the control shaft, a plurality of spaced spur wheels carried by and loosely mounted on each of said arms, foot operated means operatively connected with said control shaft for rotating same and thereby lowering the spur wheels into operative engagement with the roadway to prevent skidding, and resilient means tending to return the spur wheels to their original inoperative position.

8. In an anti-skid apparatus for motor vehicles, the combination of a rotatable control shaft, means for adjustably and detachably securing said shaft to the rear axle housing in a plane forward of and below the plane of the rear axle, a pair of arms affixed to the control shaft, a plurality of spaced spur wheels carried by and loosely mounted on each of said arms, means operatively connected with said control shaft for rotating same and thereby lowering the spur wheels into operative engagement with the roadway to prevent skidding, and resilient means tending to return the spur wheels to their original inoperative position.

9. In an anti-skid apparatus for motor vehicles, the combination of a rotatable control shaft, means for adjustably and detachably securing said shaft to the rear axle housing in a plane forward of and below the plane of the rear axle, a pair of arms affixed to the control shaft, a plurality of spaced spur wheels carried by and loosely mounted on each of said arms, foot operated means operatively connected with said control shaft for rotating same and thereby lowering the spur wheels into operative engagement with the roadway to prevent skidding, resilient means tending to return the spur wheels to their original inoperative position, and a lug bar arranged to engage an element carried by the control shaft to limit the rotative movement of said shaft and attached parts.

10. In an anti-skid apparatus for motor vehicles, the combination of a rotatable control shaft, means for adjustably and detachably securing said shaft to the rear axle housing in a plane forward of and below the plane of the rear axle, a pair of arms affixed to the control shaft and extending in a forward direction, a plurality of spaced spur wheels carried by and loosely mounted on each of said arms, foot operated means operatively connected with said control shaft for rotating same and thereby lowering the spur wheels into operative engagement with the roadway to prevent skidding, and resilient means tending to return the spur wheels to their original inoperative position.

11. In an anti-skid apparatus for motor vehicles, the combination of a rotatable control shaft, means for adjustably and detachably securing said shaft to the rear axle housing in a plane forward of and below the plane of the rear axle, a pair of arms affixed to the control shaft, a plurality of spaced spur wheels carried by and loosely mounted on each of said arms, said arms and spur wheels being positioned in planes within the plane of the chassis whereby they may be substantially raised from the roadway and when raised are in a concealed position, foot operated means operatively connected with said control shaft for rotating same and thereby lowering the spur wheels into operative engagement with the roadway to prevent skidding, and resilient means tending to return the spur wheels to their original inoperative position.

12. In an anti-skid apparatus for motor vehicles, the combination of a rotatable control shaft, means for adjustably and detachably securing said shaft to the rear axle housing in a plane forward of and below the plane of the rear axle, a pair of arms affixed to the control shaft, a plurality of spaced spur wheels carried by and loosely mounted on each of said arms, said spur wheels having their teeth offset from the teeth of the other spur wheel of the set, said spur wheels normally being disposed in a concealed position within the chassis, means operatively connected with said control shaft for rotating same and thereby lowering the spur wheels into operative engagement with the roadway to prevent skidding, and resilient means tending to return the spur wheels to their original inoperative position.

DUANE L. POTTER.